E. J. BROOKS.

BOX SEAL.

APPLICATION FILED MAR. 19, 1919.

Reissued May 20, 1919. 14,649.

Inventor

Edward J. Brooks by Axel V. Beeten

Attorney

UNITED STATES PATENT OFFICE.

EDWARD J. BROOKS, OF EAST ORANGE, NEW JERSEY.

BOX-SEAL.

14,649. Specification of Reissued Letters Patent. Reissued May 20, 1919.

Original No. 925,451, dated June 22, 1909, Serial No. 484,662, filed March 20, 1909. Application for reissue filed March 19, 1919. Serial No. 283,651.

*To all whom it may concern:*

Be it known that I, EDWARD J. BROOKS, a citizen of the United States, and a resident of East Orange, in the county of Essex and State of New Jersey, have invented a new and useful Improvement in Box-Seals, of which the following is a specification.

This invention relates to the combination of metallic seal parts and box straps as means for sealing wooden packing cases or boxes so as to insure the detection of any opening thereof for the abstraction of the contents.

Heretofore it has been customary to unite the seal part and box strap and to complete the sealing operation by means of a nail driven through the seal part and strap ends, or through the latter at least, into the wood of the box. This necessitated the location of the seal part on the box over an end or side of the box to provide sufficient depth of wood to receive the nail. Otherwise the seal nail might do serious damage to the contents of the box. And it has been customary to arrange a sealed box strap over the row of nails in the box proper at each of its ends.

Examples of such box seals are set forth in my previous specification forming part of United States Letters Patent No. 847,276 dated March 12, 1907, and previous specifications therein referred to, and in my previous specification forming part of an application for United States Letters Patent filed March 3, 1909, Serial No. 481,201.

In a companion specification forming part of an application for United States Letters Patent filed March 19, 1909, Serial No. 484,347, I have set forth means whereby to render such "box seals" nailless, and thus to provide for using a single box strap if desired with a single seal part located centrally on the box cover or on the bottom or one of the ends or sides, or in any desired position, without endangering the contents of the box at the sealing operation.

The leading object of the present invention is to provide for sealing wooden boxes in the manner set forth in said companion specification by means of metallic seal parts of more simple and inexpensive construction; and this invention consists in a novel combination of parts and in an improved seal part of such simpler and cheaper construction as hereinafter more particularly described and claimed.

A sheet of drawings accompanies this specification as part thereof.

Like reference characters refer to like parts in all the figures.

Figure 5:
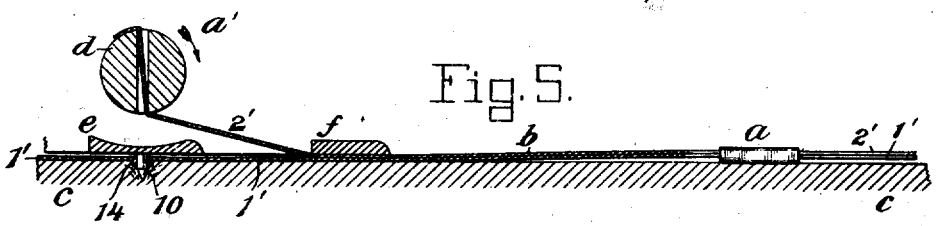
Figs 5 and 6 are sectional elevations illustrating the sealing operation.
Figure 6:
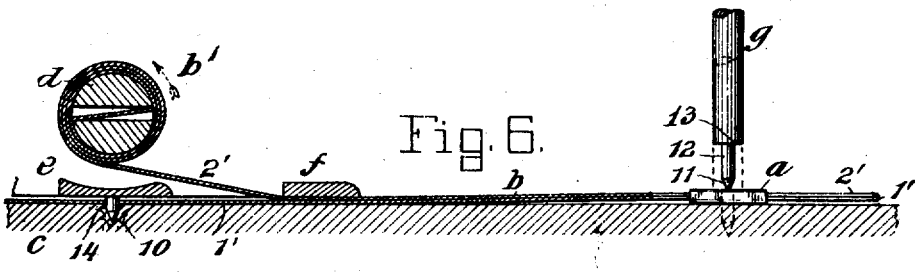

In carrying this invention into effect a metallic seal part, $a$ or $a^2$ or $a^3$ or $a^4$, and a metallic box strap, $b$, are employed in connection with a wooden box portion $c$, and with a box-strap tool or "tightener", parts of which are represented at $d$, $e$ and $f$ in Figs. 5 and 6, and a suitable sealing tool, $g$, Fig 6.

Figure 2:
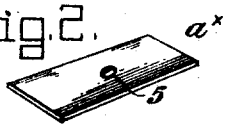
Fig. 2 is a perspective view of the blank of the seal part represented in Fig. 1 as it appears before being bent.
Figure 3:
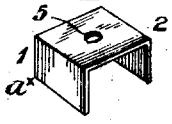
Fig. 3 is a perspective view showing the same blank with its first two bends.

The seal part $a$ or $a^2$ or $a^3$ or $a^4$, in each of its forms, is made by bending a flat blank ($a^x$, Fig. 2), which may consist of a suitable length of the strap iron which forms the box strap $b$, or may be cut from tin scrap or any other suitable sheet metal. The more brittle the metal the better, provided it will receive cold the bends hereinafter described and represented in the accompanying drawings, as any attempt to rebend any portion of the seal part should result in its mutilation and the disclosure of the attempt to violate the seal.

In each of the species, the lateral edges, 1 and 2, of the seal part are formed from the ends of the blank ($a^x$) by successive bends at right angles, all of which are readily formed in a bending machine at what is practically a single operation. The other edges or ends, 3 and 4, of the seal part are permanently open, and admit the ends 1′ and 2′ of the box strap $b$ as in Fig. 1 and Figs. 5 to 8 inclusive.

Figure 4:
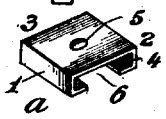
Fig. 4 is a perspective view showing the four-bend seal part ready for use.

In the species represented by Figs. 1 to 8 inclusive the blank $a^x$ is provided with a central hole, 5, to center the sealing tool, $g$, and its edge and bottom portions formed by the ends of the blank are symmetrical, and of such length as to leave a space, 6, beneath said centering hole 5, as shown in Fig. 4.

Figure 9:
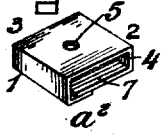
Figs. 9, 10 and 11 are perspective views of modified seal parts of substantially the same construction as the seal part shown in Fig. 1 and Figs. 4 to 8 inclusive.

In the species represented by Fig. 9 the blank is elongated at one end with reference to a centering hole 5, so as to form a bottom portion, 7, substantially parallel with the top of the seal part $a^2$, bent inward from one edge and overlapping the other end of the piece of metal at the opposite edge of the seal part.

Figure 10:
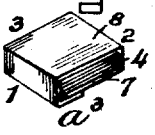

In the species represented by Fig. 10 the seal part $a^3$ is identical with the seal part $a^2$ last described, except that its top, 8, is without a centering hole (5, Fig. 9) which may in some cases be dispensed with.

Figure 11:
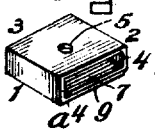

In the species represented by Fig. 11, the seal part $a^4$ has a centering hole 5 in its top, as in the first and second species, and has two overlapping bottom portions, 7 and 9, extending substantially from edge to edge beneath said hole. It will be seen that there is merely the same number of thicknesses of metal for the punch to penetrate in this form as compared with the seal part $a^3$, Fig. 10. The box strap $b$ may be cut from a continuous length of any suitable strap iron, and requires no preliminary treatment.

The tightener represented in Figs. 5 and 6 is or may be of the construction set forth in said previous specification forming part of said application, Serial No. 481,201, and the parts represented in Figs. 5 and 6 are the slotted shaft of the tool, represented at $d$, a cross bar of the frame beneath said shaft, represented at $e$, and a cross bar at the front edge of the frame, represented at $f$. For the purposes of the present invention said cross bar $e$ beneath the winding shaft may be provided with a spur, 10, which is driven through one of the box-strap ends, 1′, into the wooden box cover $c$ to preliminarily and temporarily fasten the box-strap end for the tightening operation. Otherwise the tool may be of the construction set forth in said previous specification forming part of said application Serial No. 481,201, or of any suitable known or improved construction.

The sealing tool $g$ represented in Fig. 6 is or may be an ordinary nail punch having a sharp tapered point, 11, a cylindrical or equivalent portion, 12, immediately above the same, and preferably, a stop shoulder 13, by which the penetration of the point is limited.

Figure 1:
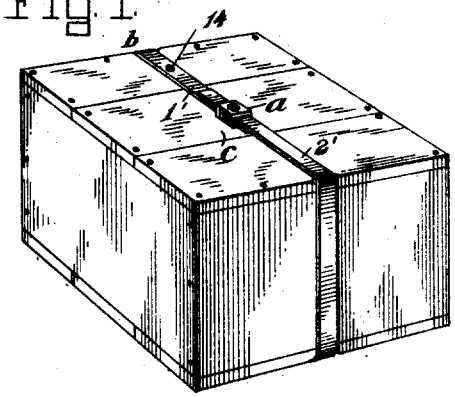
Figure 1 is a perspective view of a wooden box sealed according to the present invention.
Figure 7:
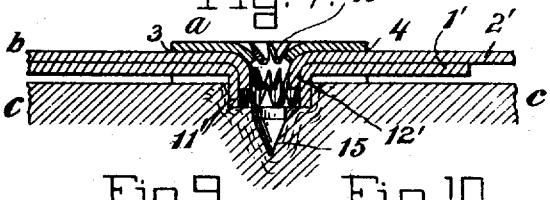
Figs. 7 and 8 represent magnified sections through the completed seal and the subjacent portion of the box.
Figure 8:
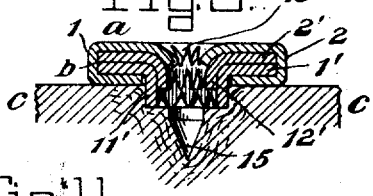

After passing the box-strap $b$ loosely around the box (Fig. 1) in the desired position, both box-strap ends 1′ and 2′ are threaded through the seal part $a$ or $a^2$ or $a^3$ or $a^4$. The tightener $d$—$e$—$f$ is then applied so as to drive its spur 10 through one end, 1′, of the box strap into the wood of the box cover $c$, and thus to preliminarily fasten that box-strap end for the stretching operation. The other box-strap end, 2′, being uppermost, is drawn beneath the front cross bar $f$ of the tightener, and temporarily interlocked with the shaft $d$ by threading it through the slot of the latter and bending its extremity to resist withdrawal as represented in Fig. 5. The shaft $d$ is then turned in the direction represented by the arrow $a'$, Fig. 5, until the box-strap $b$ is under sufficient tension to embed it in the box corners, at least, as set forth in said previous specification last referred to. With the box strap $b$ under such tension, and the seal part $a$ or $a^2$ or $a^3$ or $a^4$ in the desired position, the sealing tool $g$ is applied as in Fig. 6, its point 11 being centered by means of said centering hole 5, and a blow on its upper end by means of a hammer or the like drives the point 11 and shank 12 of the sealing tool through the two strap ends, and through the seal part, and completes the sealing operation. The stroke of the sealing-tool is represented by dotted lines in Fig. 6, and the effect of the tool, which is immediately removed from the box, is represented by Figs. 7 and 8. After removing the sealing tool $g$, the shaft $d$ of the tightener is turned backward, as represented by the dotted arrow $b'$ in Fig. 6, to unwind the box-strap end attached thereto, the tightener is then also removed, and the loose box-strap end is cut off close to the seal part as represented in Fig. 1.

Referring to Figs. 7 and 8, it will be seen that in the manner above described locking portions 11′, 12′ and 13′, of the two strap ends and of the top of said seal part $a$, are simultaneously made to project rigidly downward at right-angles to the top of the box cover $c$, and to interlock with each other and with the wood of the box cover around an empty permanent indentation, so as to securely seal the box without the aid of nails driven through the seal part and box-strap ends as heretofore considered necessary.

In the species represented by Figs. 9 to 11 inclusive, in addition to the locking portion 13′ represented in Figs. 7 and 8, locking portions of the bottom of the seal part would obviously be formed at the sealing operation and the latter would be embedded in the wood of the box part $c$. A single sealed box strap may in the above manner be located between the ends of the box as in Fig. 1, or between the sides or between the bottom and top of the box, as there is no seal nail to be driven through the cover or like box part into the ends as heretofore. The box-strap and seal part may also, of course, be otherwise arranged and duplicated if desired. The indentation by which one box-strap end is preliminarily fastened as above described is represented at 14 in Fig. 1, and the empty permanent indentation left in the wood by the sealing tool *g* is represented at 15 in Figs. 7 and 8. Instead of square, the seal parts may be oblong, with either their closed edges or their open edges longest; those of different users may be differently colored by dipping them in suitable paint or otherwise; and other like modifications will suggest themselves to those skilled in the art.

I do not claim herein the within described method of sealing wooden boxes without the aid of nails; nor, broadly, the combination with a wooden box and a superposed metallic box strap under tension, having overlapped ends, of a metallic seal part embracing the overlapped ends of said box strap and having a portion parallel with said box-strap ends, said box-strap ends and said portion of the seal part parallel therewith having locking portions projecting rigidly at right angles to the subjacent surface of the box, and interlocked with each other around an empty permanent indentation in the wood of the box, whereby a nailless box seal is formed; but hereby disclaim the same in favor of said companion specification forming part of said application Serial No. 484,347 hereinbefore referred to.

I claim:

1. A nailless metallic box-seal comprising: a box strap of sheet metal the ends of which are under tension in overlapped and superposed relation, a sealing member having the form of a flat sleeve of substantially the width of the strap to admit endwise its overlapped and superposed ends and to embrace laterally both edges of both strap ends, said member formed with parallel rectangular bends and constructed with a top portion the metal of which is, by a punching operation, permanently interlocked with the ends of the strap.

2. The combination with a wooden box and a superposed metallic box strap under tension having overlapped ends, of a metallic seal part formed by rectangular bends parallel with the longitudinal edges of said box strap and having open ends to admit said overlapped ends of the box strap and a portion parallel with said box-strap ends, said box-strap ends and said portion of the seal part parallel therewith having locking portions projecting rigidly at right angles to the subjacent box surface, and interlocked with each other, whereby a nailless box seal is formed.

3. An improved metallic seal part for box seals, adapted to admit the overlapped ends of a box strap endwise and to embrace their lateral edges; such seal part being formed by parallel rectangular bends and constructed with a top portion adapted to be interlocked with the box strap by a punching operation, and with open ends and closed lateral edges.

4. An improved metallic seal part for box seals, adapted to admit the overlapped ends of a box strap endwise and to embrace their lateral edges; such seal part being formed by parallel rectangular bends, and constructed with a top portion having a centering hole, an opening in its bottom beneath said hole, open ends and closed lateral edges, substantially as hereinbefore specified.

Signed at New York city, in the borough of Manhattan, in the county and State of New York, this 11th day of March 1919.

EDWARD J. BROOKS.